(12) United States Patent
Li et al.

(10) Patent No.: US 9,984,369 B2
(45) Date of Patent: May 29, 2018

(54) SYSTEMS AND METHODS TO IDENTIFY TARGET VIDEO CONTENT

(75) Inventors: Zhi Li, Martinez, CA (US); Canhui Ou, Danville, CA (US); Raghvendra Savoor, Walnut Creek, CA (US); Dipak Ghosal, San Ramon, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1761 days.

(21) Appl. No.: 11/959,905

(22) Filed: Dec. 19, 2007

(65) Prior Publication Data
US 2009/0165031 A1    Jun. 25, 2009

(51) Int. Cl.
| | |
|---|---|
| G06F 9/00 | (2006.01) |
| G06Q 20/38 | (2012.01) |
| G06F 21/10 | (2013.01) |
| H04N 7/173 | (2011.01) |
| H04N 21/254 | (2011.01) |
| H04N 21/45 | (2011.01) |
| H04N 21/835 | (2011.01) |
| H04N 21/84 | (2011.01) |

(52) U.S. Cl.
CPC ......... *G06Q 20/3825* (2013.01); *G06F 21/10* (2013.01); *H04N 7/17318* (2013.01); *H04N 21/2541* (2013.01); *H04N 21/4532* (2013.01); *H04N 21/835* (2013.01); *H04N 21/84* (2013.01); *G06F 2221/074* (2013.01); *G06F 2221/0737* (2013.01)

(58) Field of Classification Search
USPC ........................................................ 705/51
See application file for complete search history.

(56) References Cited

U.S. PATENT DOCUMENTS

| | | | |
|---|---|---|---|
| 4,739,398 A | 4/1988 | Thomas et al. | |
| 6,226,618 B1 * | 5/2001 | Downs et al. | 705/51 |
| 6,332,030 B1 | 12/2001 | Manjunath et al. | |
| 6,510,458 B1 | 1/2003 | Berstis et al. | |
| 6,556,689 B1 | 4/2003 | Xia et al. | |
| 7,020,206 B1 | 3/2006 | Acharya et al. | |
| 7,064,790 B1 | 6/2006 | Varma et al. | |
| 7,209,571 B2 | 4/2007 | Davis et al. | |
| 7,936,824 B2 | 5/2011 | Lee | |
| 2002/0032864 A1 | 3/2002 | Rhoads et al. | |
| 2002/0126872 A1 | 9/2002 | Brunk et al. | |

(Continued)

FOREIGN PATENT DOCUMENTS

| | | |
|---|---|---|
| WO | 03032136 | 4/2003 |
| WO | 2005064885 | 7/2005 |
| WO | 2007053112 | 5/2007 |

OTHER PUBLICATIONS

Dipak Ghosal, System and Method of Managing Protected Video Content, U.S. Appl. No. 11/649,381, dated Jan. 3, 2007 (28 pgs).

(Continued)

*Primary Examiner* — Zeshan Qayyum
(74) *Attorney, Agent, or Firm* — Toler Law Group, PC

(57) ABSTRACT

A method of identifying target video content is provided. The method includes accessing content metadata of a video content item at a content storage. The method also includes determining at least one content signature based on the video content item and determining whether the video content item includes target content based at least partially on the content signature and the content metadata.

25 Claims, 10 Drawing Sheets

(56) References Cited

U.S. PATENT DOCUMENTS

| | | |
|---|---|---|
| 2002/0151992 A1* | 10/2002 | Hoffberg ............ G05B 19/0426 700/83 |
| 2003/0037010 A1 | 2/2003 | Schmelzer |
| 2003/0103461 A1 | 6/2003 | Jorgenson |
| 2003/0174859 A1 | 9/2003 | Kim |
| 2003/0191764 A1 | 10/2003 | Richards |
| 2004/0039926 A1* | 2/2004 | Lambert ....................... 713/189 |
| 2004/0203423 A1* | 10/2004 | Kurhila ................. H04W 24/00 455/67.11 |
| 2004/0243634 A1 | 12/2004 | Levy |
| 2004/0250080 A1 | 12/2004 | Levy et al. |
| 2005/0022229 A1 | 1/2005 | Gabriel et al. |
| 2005/0027766 A1 | 2/2005 | Ben et al. |
| 2005/0050332 A1 | 3/2005 | Serret-Avila et al. |
| 2005/0154681 A1 | 7/2005 | Schmelzer |
| 2005/0183143 A1 | 8/2005 | Anderholm et al. |
| 2005/0204037 A1 | 9/2005 | Levy |
| 2006/0021057 A1* | 1/2006 | Risan et al. ..................... 726/26 |
| 2006/0062426 A1 | 3/2006 | Levy et al. |
| 2006/0075440 A1* | 4/2006 | Rijckaert ......... G11B 20/00086 725/88 |
| 2006/0047952 A1 | 5/2006 | Van Den Heuvel et al. |
| 2006/0130118 A1 | 6/2006 | Damm et al. |
| 2006/0153296 A1 | 7/2006 | Deng |
| 2006/0184454 A1 | 8/2006 | Ananda |
| 2006/0184961 A1 | 8/2006 | Lee et al. |
| 2006/0187358 A1 | 8/2006 | Lienhart et al. |
| 2006/0272026 A1* | 11/2006 | Niwano et al. ................. 726/27 |
| 2007/0033408 A1 | 2/2007 | Morten |
| 2007/0061835 A1 | 3/2007 | Klein, Jr. et al. |
| 2007/0063884 A1 | 3/2007 | Iwamura et al. |
| 2007/0100701 A1* | 5/2007 | Boccon-Gibod et al. ...... 705/21 |
| 2007/0110089 A1 | 5/2007 | Essafi et al. |
| 2007/0122108 A1 | 5/2007 | Bontempi et al. |
| 2007/0124796 A1 | 5/2007 | Wittkotter et al. |
| 2007/0124822 A1 | 5/2007 | Liu |
| 2007/0136782 A1* | 6/2007 | Ramaswamy .......... G11B 27/11 725/138 |
| 2007/0143219 A1 | 6/2007 | Shen et al. |
| 2007/0156694 A1 | 7/2007 | Lim |
| 2007/0185840 A1 | 8/2007 | Rhoads |
| 2007/0204078 A1* | 8/2007 | Boccon-Gibod et al. ...... 710/54 |
| 2007/0220266 A1 | 9/2007 | Cooper et al. |
| 2007/0250863 A1* | 10/2007 | Ferguson ......................... 725/46 |
| 2007/0260643 A1* | 11/2007 | Borden et al. ................. 707/201 |
| 2007/0276823 A1* | 11/2007 | Borden ............. G06F 17/30097 |
| 2007/0289022 A1* | 12/2007 | Wittkotter ....................... 726/27 |
| 2008/0059536 A1 | 3/2008 | Brock et al. |
| 2008/0134175 A1* | 6/2008 | Fitzgerald et al. ............... 718/1 |
| 2008/0134176 A1* | 6/2008 | Fitzgerald et al. ............... 718/1 |
| 2008/0134178 A1* | 6/2008 | Fitzgerald et al. ............... 718/1 |
| 2008/0231595 A1 | 9/2008 | Krantz et al. |
| 2008/0256647 A1 | 10/2008 | Kim et al. |
| 2009/0037967 A1* | 2/2009 | Barkan et al. ................. 725/105 |
| 2009/0131123 A1 | 5/2009 | Coersmeier et al. |
| 2009/0144325 A1* | 6/2009 | Chastagnol et al. ....... 707/104.1 |
| 2009/0157869 A1 | 6/2009 | Cleary |

OTHER PUBLICATIONS

Robles, et al., Towards a Content-Based Video Retrieval System Using Wavelet-Based Signatures, 7th IASTED International Conference on Computer Graphics and Imaging—CCIM, pp. 344-349, 2004.

* cited by examiner

SYSTEMS AND METHODS TO IDENTIFY TARGET VIDEO CONTENT

FIELD OF THE DISCLOSURE

The present disclosure is generally related to identifying target video content.

BACKGROUND

Video sharing services have become increasingly popular on the Internet. Services such as Metacafe and YouTube may allow users to upload video content for access by other users. Occasionally, a user may upload video content that they should not, such as video content that includes inappropriate subject matter or video content that is copyright protected and that the user does not have permission from the copyright owner to upload. Hence, there is a need for an improved method and system to identify target video content and to monitor transmissions of video content.

DETAILED DESCRIPTION OF THE DRAWINGS

In a particular embodiment, a system to monitor data transmissions is provided. The system includes a network interface to receive video content data and a signature module to generate a content signature based on the video content data. The system also includes a prohibited content module to select one or more prohibited content signatures associated with at least one prohibited content item based on content metadata of the video content and to compare the content signature to the one or more prohibited content signatures.

A method of monitoring transmission of video content is also provided. The method includes monitoring a data transmission. The data transmission includes video content data. The method also includes generating a content signature based on the video content data and identifying content metadata associated with the video content. The method further includes determining whether the video content includes prohibited content by evaluating the content signature and the content metadata.

A system to identify target video content is also provided. The system includes a database interface to access at least one video content item from a content storage. The content storage includes the at least one video content item and content metadata of the at least one video content item. The system also includes a signature module coupled to the database interface to determine a content signature based on the at least one video content item and a target content module to compare the content signature to target content signature data based at least partially on the content metadata.

A method of identifying target video content is provided. The method includes accessing content metadata of a video content item at a content storage. The method also includes determining at least one content signature based on the video content item and determining whether the video content item includes target video content based at least partially on the content signature and the content metadata.

A computer-readable medium is also provided. That computer-readable medium includes instructions executable by a processor to access content metadata of a video content item at a content storage. The computer-readable medium also includes instructions executable by a processor to determine at least one content signature based on the video content item. The computer-readable medium further includes instructions executable by a processor to determine whether the video content item includes target video content based at least partially on the content signature and the content metadata.

Figure 1:
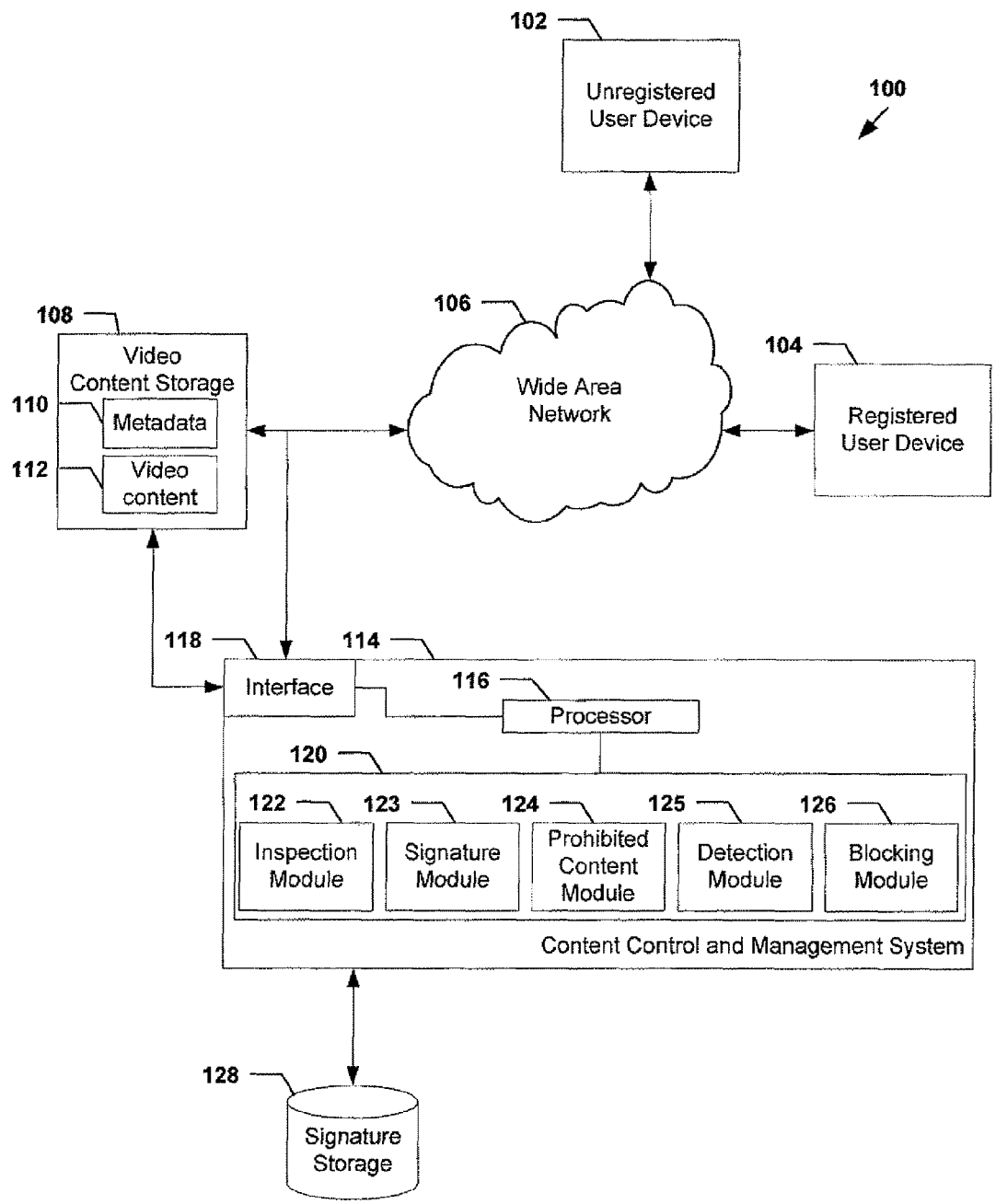
FIG. 1 is a block diagram of a particular illustrative embodiment of a system to monitor transmission of video content.

FIG. 1 depicts a first particular embodiment of a system to monitor data transmissions. The system, generally designated 100, includes a registered user device 104 and an unregistered user device 102 adapted to communicate with a video content storage 108 via a wide area network 106, such as the Internet. The user devices 102 and 104 may access video content 112 stored at the video content storage 108. The video content 112 may be associated with metadata 110. Generally, the metadata 110 includes information descriptive of the video content 112, such as file information (e.g., file format file size, upload date and/or time, data identifying a user who uploaded the content, etc.), content descriptive information (e.g., title, names of persons associated with the video content, plot elements, etc.), popularity information (e.g., viewer ratings, number or frequency of downloads, etc.), other information related to the video content, or any combination thereof.

In a particular embodiment, the registered user device 104 may be adapted to transmit data to the video content storage 108 to upload additional video content and to provide metadata related to the additional video content. The video content storage 108 may include any data storage device, such as one or more electric or static memory devices, one or more optical memory devices, one or more magnetic memory devices, any other memory device, or any combination thereof. Additionally, the video content storage 108 may include any data storage structure, such as a database, a flat file system, any other data storage arrangement, or any combination thereof. The system 100 may include a content control and management system 114. The content control and management system 114 may be adapted to monitor data transmissions received at the video content storage 108 to identify video content uploaded to the video content storage 108. The content control and management system 114 may be operated by an operator of the video content distribution system, or by any other entity. For example, the content control and management system 114 may be based at a client device, such as the registered use device 104, or may be based at or operated by an Internet service provider, a provider of video content (e.g., a copyright owner), a video content distributor (e.g., at a video head-end office), any other entity with access to a transmitted video stream, or any combination thereof.

The content control and management system 114 may include a network interface 118 to receive video content data uploaded to the video content storage 108. The video content data may include raw video content or compressed video content. The video content data may also include metadata related to the video content. In a particular illustrative embodiment, the video content data may include a Moving Picture Experts Group (MPEG) video data stream. The content control and management system 114 may also include a processor 116 and memory 120 accessible to the processor 116. In an illustrative embodiment, the content control and management system 114 may include various modules 122-126 adapted to perform various functions of the content control and management system 114. The modules 112-126 can include logic, hardware, computer instructions that may be executable by the processor 116, or any combination thereof. Additionally, the modules 112-126 may be discrete functional elements, such as logic blocks, or may be combined functional elements, such as one or more software instructions set executable by the logic to perform the functions described herein.

Figure 8:
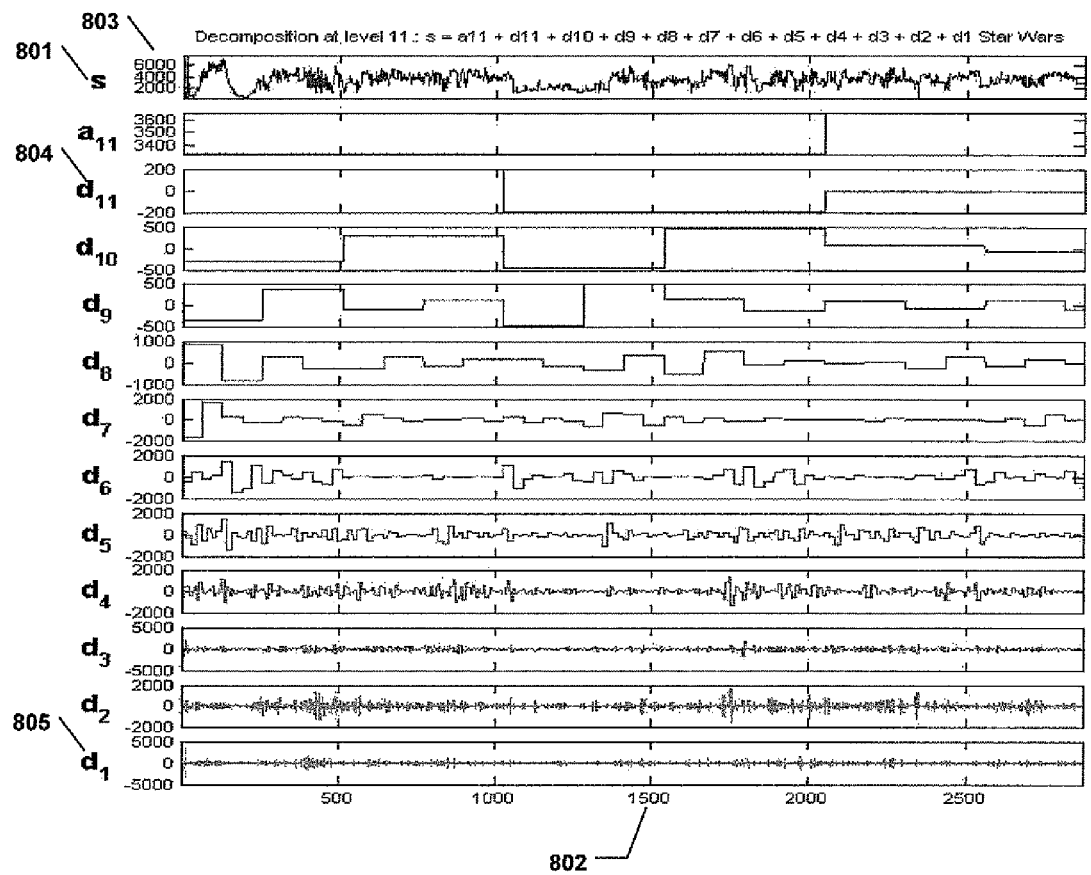
FIG. 8 is a diagram of an exemplary embodiment of signatures related to video content.

In a particular embodiment, the content control and management system 114 may include an inspection module 122 to inspect data packets sent to the video content storage 108 to determine whether the data packets include video content. The content control and management system 114 may also include a signature module 123. The signature module 123 may be adapted to process video content sent to the video control store 108 to generate a content signature based on the video content. For example, the content signature may include a sequence of coefficients of a wavelet transform of at least a portion of the video content. In an illustrative embodiment, a content signature can be generated by applying a wavelet transform to a plurality of subsections of the video content. For example, the video content can include Moving Picture Experts Group (MPEG) content having a plurality of frames. The signature module 123 can determine a plurality of subsections of the MPEG video content based at least partially on a sequence of Intra-coded frames (I-frames), Predictive-coded frames (P-frames), or any combination thereof within the MPEG video content. For instance, each subsection can be identified by a sequence number of an I-frame that is designated as the beginning or end of the subsection. By applying a wavelet transform, such as a Haar wavelet transform, to each of the subsections, a sequence of coefficients can be generated. Illustrative embodiments of content signatures are depicted in FIG. 8.

In a particular illustrative embodiment, a Haar wavelet transform may be applied to each subsection of a video content item to generate one or more signatures corresponding to the video content. Each signature includes a sequence of coefficients produced by applying the wavelet transform to the plurality of I-frames. In an illustrative, non-limiting embodiment, a plurality of signatures corresponding to each subsection of the video content can be generated. Each of the plurality of signatures can correspond to a different scale or degree of resolution, such as a lowest degree of resolution having a fewest number of coefficients, a highest degree of resolution having a greatest number of coefficients, and other degrees of resolution having varying numbers of coefficients.

The content control and management system 114 may also include a prohibited content module 124. The prohibited content module 124 may be adapted to compare the content signature to prohibited content signature data. For example, the prohibited content signature data may include content signatures associated with prohibited content, such as copyrighted content or content that has been deemed inappropriate. In an illustrative embodiment, the prohibited content module 124 may compare the content signature to prohibited content signature data based at least partially on metadata associated with the video content. For example, a signature storage 128 may include a plurality of content signatures associated with prohibited content. The content signature for a particular video content item may vary depending on the resolution of the particular video content item. Therefore, the signature storage may include more than one prohibited content signature for each item of prohibited video content. The prohibited content module 124 may select one or more prohibited content signatures to compare the content signature to based on the resolution of the video content and resolution values associated with each prohibited content signature.

The content control and management system 114 may also include a detection module 125. The detection module 125 may be adapted to compare a previous version of particular prohibited video content to received video content to determine whether a user has modified the content format. For example, when video content including prohibited video content is received from the registered user device 104, the detection module 125 may compare metadata associated with the video content to prohibited content data to determine whether the registered user device 104 or a user associated with the registered user device 104 has previously uploaded the video content or attempted to upload the video content with different metadata.

The content control and management system 114 may also include a blocking module 126. The blocking module 126 may be adapted to block data transmissions when received video content includes prohibited video content. The blocking module may terminate an ongoing data transmission that includes the prohibited video content, may prevent future data transmissions from the device (such as, registered user device 104) or user that sent the prohibited video content, or any combination thereof.

In operation, a user at registered user device 104, such as a personal digital assistant, a mobile phone, a set-top box, a computer, a video game console, another device adapted to view or store video content, or any combination thereof, may upload video content to the video content storage 108 via the wide area network 106. The user may provide metadata descriptive of the video content transmitted to the video content storage 108. In a particular illustrative embodiment, at least a portion of the metadata may be automatically generated.

The inspection module 122 may inspect data packets received at the video content storage 108 to determine whether the data packets include video content. When video content is identified by the inspection module 122, the signature module 123 may be activated to generate at least one content signature based on the video content.

The prohibited content module 124 may identify metadata associated with the video content. For example, the prohibited content module 124 may access metadata 110 stored at the video content storage 108 and associated with the video content 112. In another particular embodiment, the inspection module 122 may identify the metadata from the data transmitted to the video content storage 108 and may provide the metadata to the prohibited content module 124. The prohibited content module 124 may access the signature storage 128 to identify content signatures associated with content that is prohibited from being stored at or accessible via the video content storage 108. In a particular embodiment the prohibited content module 124 may access one or more prohibited content signatures based on metadata associated with the received video content. For example, the content signature associated with the received video content may be dependant upon the resolution of the video content. The prohibited content module 124 may identify the resolution of the video content based on the metadata, and may select a prohibited content signature associated with a resolution value similar to the resolution value of the received video content.

The prohibited content module 124 may compare one or more prohibited content signatures to the one or more content signatures associated with the received video content to determine whether the received video content includes prohibited video content. In a particular embodiment, prohibited video content may include copyright protected content not authorized for storage or uploading to the video content storage 108 or video content that is considered inappropriate for storage or uploading to the video content storage 108. To illustrate, prohibited content may include blacklisted content that has been identified by content providers or copyright owners as not being authorized for upload to or storage at the video content storage 108.

When the prohibited content module 124 determines that received video content includes prohibited video content, the blocking module 126 may be activated. The blocking module may inhibit transmission of the video content to the video content storage 108. For example, the blocking module 126 may add the registered user device 104 to a blacklist, thereby preventing receipt of video content from the registered user device 104. In another example, the blocking module 126 may remove the registered user device 104 from a list of authorized devices, thereby preventing access to the video content storage 108 for upload of video content. In a particular illustrative embodiment, action taken by the blocking module 124 to inhibit the transmission of the video content may be a short term measure, such as terminating a particular connection, or may include a long term measure, such as preventing the registered user device 104 or a user associated with the registered user device 104 from re-registering and uploading video content in the future.

In a particular embodiment, the detection module 125 may also be activated when prohibited video content is detected. The detection module 125 may determine whether a user associated with the registered user device 104 has attempted to modify the format of the video content. Modifying the format of the video content may be associated with an attempt to avoid the detection of the video content as prohibited video content. If the detection module 125 determines that the user associated with the registered user device 104 has attempted to modify the format, the blocking module 126 may initiate a longer term blocking function, such as prohibiting the user associated with the registered user device 104 from uploading content in the future.

Figure 2:
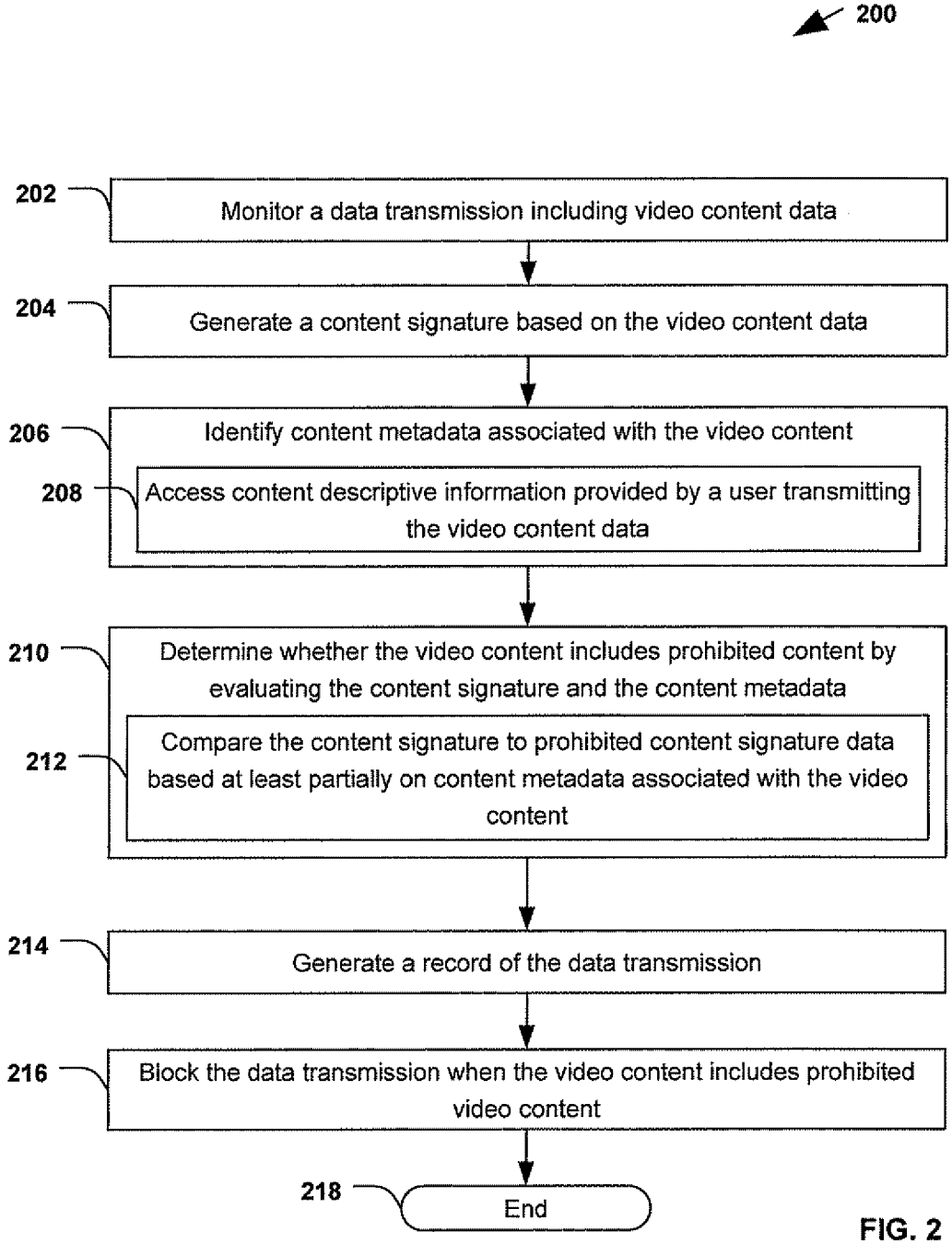
FIG. 2 is a flow diagram of a first particular illustrative embodiment of a method of monitoring transmission of video content.

FIG. 2 depicts a flow chart of a first particular embodiment of a method of monitoring transmission of video content. The method is generally designated 200. The method 200 includes, at 202, monitoring a data transmission including video content data and, at 204, generating a content signature based on the video content data. For example, the content signature may include a sequence of coefficients of a wavelet transform of at least a portion of the video content. Illustrative embodiments of content signatures are depicted in FIG. 8.

The method 200 also includes, at 206, identifying content metadata associated with the video content. In a particular embodiment, the content metadata associated with the video content may be identified by accessing metadata transmitted with the video content. For example, metadata may be sent with the video content to the video content storage. The metadata may include information descriptive of the video content, such as a title, keywords, names of persons associated with the video content, etc.; information descriptive of the transmitted data, such as a file size, a file format, a saved or created date, an Internet Protocol address associated with the sending device, etc.; or any combination thereof. In another particular embodiment, the content metadata may be identified by accessing data previously stored to the video content storage. For example, prior to uploading the video content, a user may be asked to provide metadata to the video content storage. In an illustrative embodiment, the content metadata may be identified, at 208, by accessing content descriptive information provided by the user transmitting the video content data.

The method 200 also includes, at 210, determining whether the video content includes prohibited content based on the content signature and the content metadata. For example, the method 200 may include determining whether the video content includes prohibited content by, at 212, comparing the content signature to prohibited content signature data based at least partially on content metadata associated with the content. To illustrate, as shown in FIG. 8, the content signature associated with an item of video content may depend upon the degree of resolution of the item of video content. The degree of resolution of the item of video content may be determined based on the content metadata. Based on the degree of resolution, prohibited content signatures with similar resolutions may be selected for comparison to the content signature to determine whether the item of video content include prohibited video content.

Returning to FIG. 2, the method 200 also includes, at 214, generating a record of the data transmission. For example, a record of the data transmission may be generated when the video content includes prohibited content. The record may include information descriptive of the user transmitting the video content and information descriptive of the video content. When additional video content is received from the user identified in the record, the information descriptive of the video content may be used to determine whether the user has attempted to modify the prohibited video content so that it can be uploaded. If the user is determined to have modified the prohibited content for upload, further steps may be taken to prevent the user from uploading video content data in the future.

The method 200 also includes, at 216, blocking the data transmission when the video content includes prohibited content. Blocking the data transmission may include short term steps, such as closing a connection by which the data is being transmitted, or longer term steps, such as blacklisting a user associated with the data transmission or a user device associated with the data transmission. The method terminates at 218.

Figure 3:
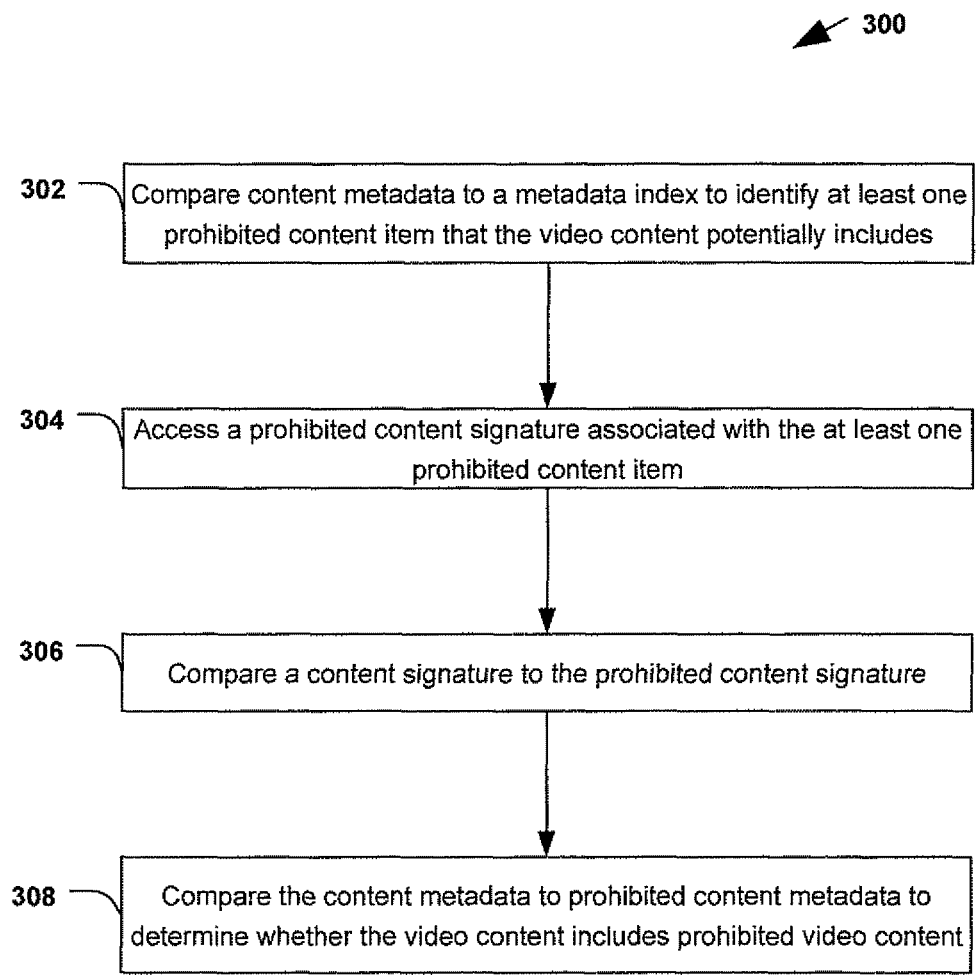
FIG. 3 is a flow diagram of a second particular illustrative embodiment of a method of monitoring transmission of video content.

FIG. 3 depicts a flow chart of a second particular embodiment of a method of monitoring transmission of video content. The method, generally designated 300, further illustrates determining whether the video content includes prohibited content. The method 300 includes, at 302, comparing the content metadata to a metadata index to identify at least one prohibited content item that the video content potentially includes. For example, the content metadata may include a title or file name of the video content and the metadata index may be searched to identify prohibited content items that have a similar title. In another example, the content metadata may include a file size and the metadata index may be searched to identify prohibited content items that have a similar file size. In yet another example, the content metadata may include a resolution value associated with the video content and the metadata index may be search to identify prohibited content items associated with similar resolution values.

The method 300 also includes, at 304, accessing a prohibited content signature associated with at least one of the prohibited content items and, at 306, comparing a content signature to the prohibited content signature. The method 300 may also include, at 308, comparing the content metadata to prohibited content metadata to determine whether the video content includes prohibited video content. For example, a comparison of titles, file sizes, or other descriptive information provided by a user may be used to determine whether the video content includes prohibited video content.

Figure 4:
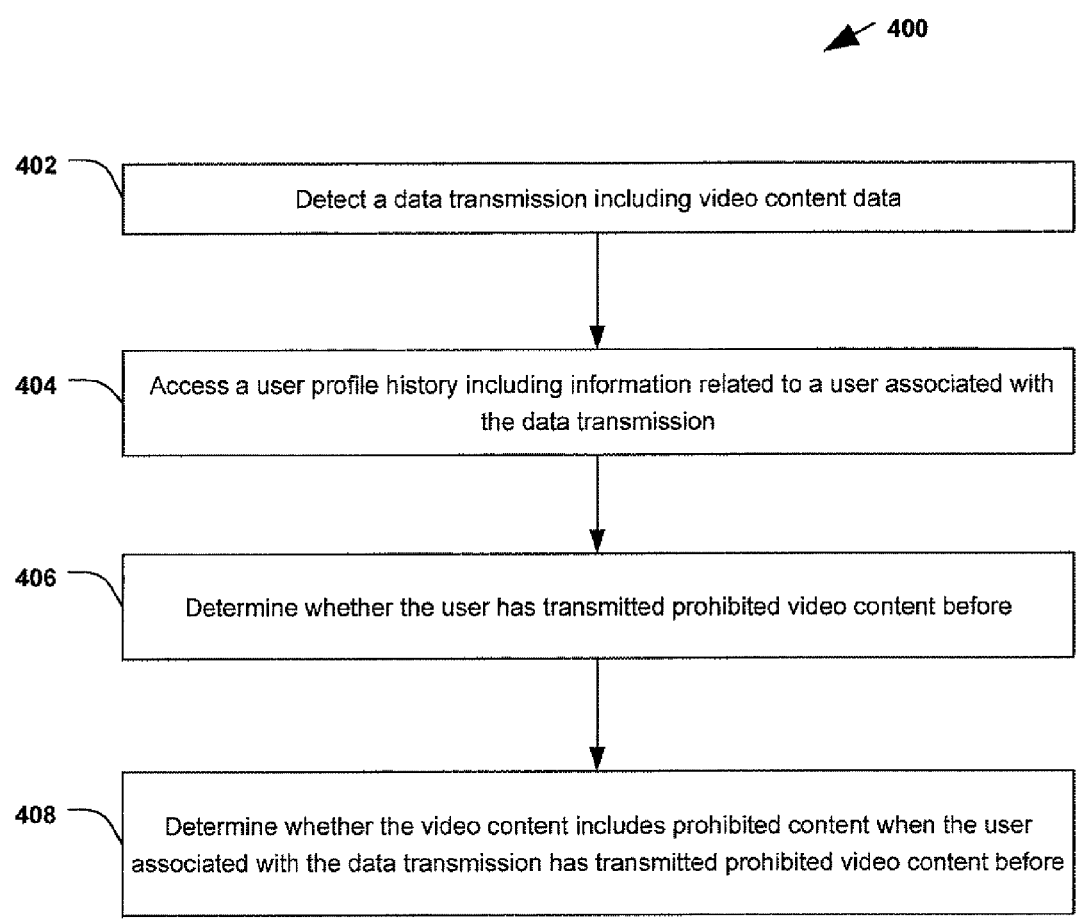
FIG. 4 is a flow diagram of a third particular illustrative embodiment of a method of monitoring transmission of video content.

FIG. 4 depicts a flow chart of a third particular embodiment of a method of monitoring transmission of video content. The method is generally designated 400. The method 400 includes, at 402, detecting a data transmission including video content. The method 400 also includes, at 404, accessing user profile history including information related to a user associated with the data transmission, and at 406, determining whether the user has a history of transmitting prohibited video content. In a particular embodiment, if the user has a history of transmitting prohibited video content, additional precautions may be taken to ensure that video content received from the user does not include prohibited video content. In a particular illustrative embodiment, if a user does not have a history of transmitting prohibited video content, video content received from the user may not be analyzed to determined whether it includes prohibited video content. In a particular illustrative embodiment, when the user has a history of transmitting prohibited video content, the method 400 may include, at 408, determining whether the video content received from the user includes prohibited video content.

Figure 5:
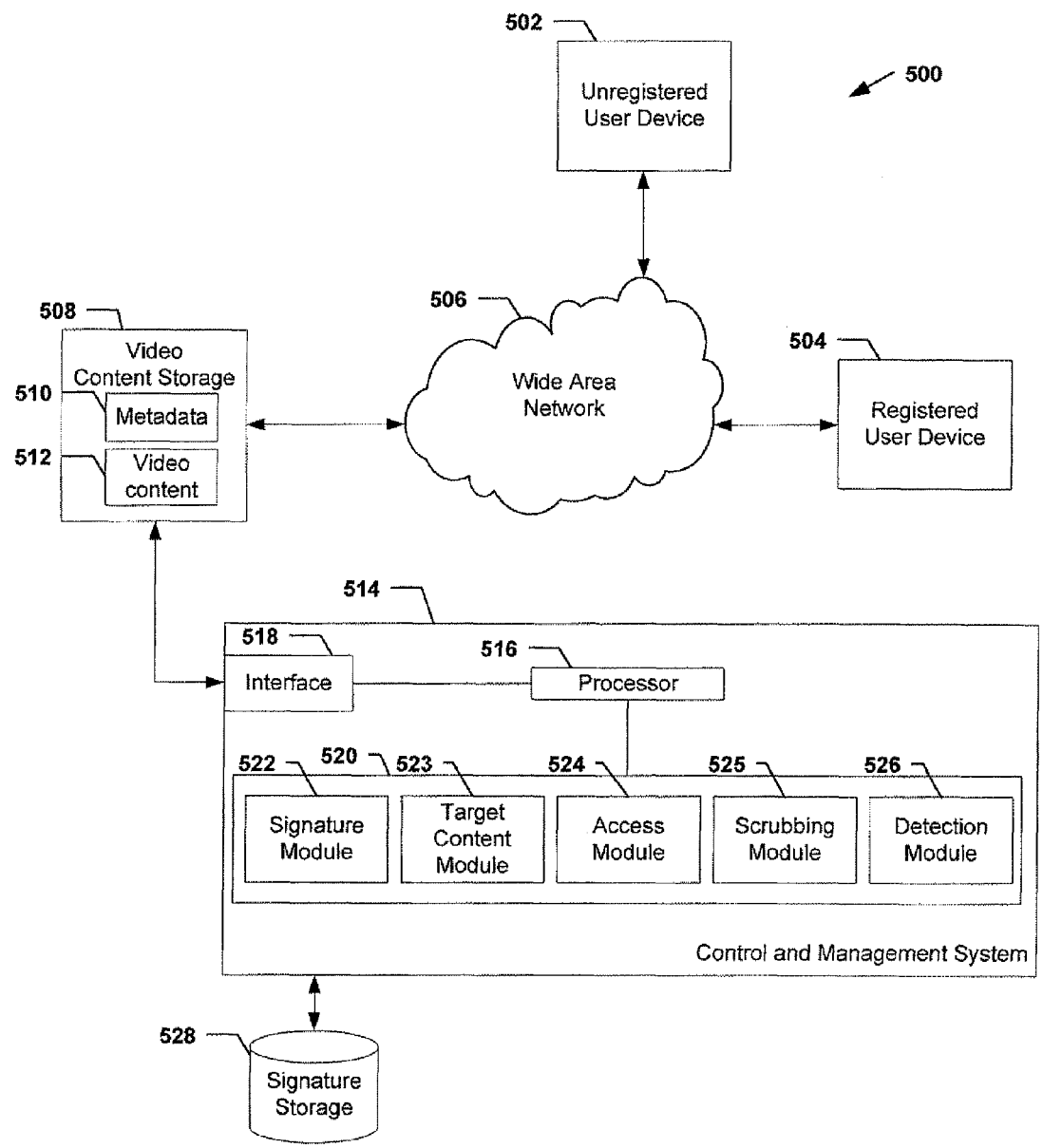
FIG. 5 is a block diagram of a particular illustrative embodiment of a system to identify target video content.

FIG. 5 depicts a particular embodiment of a system to identify target video content. The system, generally designated 500, includes an unregistered user device 502 and a registered user device 504 adapted to communicate with a video content storage 508 via a wide area network 506. The user devices 502 and 504 may access video content 512 stored at the video content storage 508. Additionally, the registered user devices 504 may upload additional video content to the video content storage 508. The video content 512 may be associated with metadata 510. Generally, the metadata 510 includes information descriptive of the video content 512, such as file information (e.g., format, size, upload date and/or time, data identifying a user who uploaded the content, etc.), content descriptive information (e.g., title, names of persons associated with the video content, plot element, etc.), popularity information (e.g., viewer ratings, number or frequency of downloads, etc.), other information related to the video content, or any combination thereof.

In a particular embodiment, the video content storage 508 may be accessible to a control and management system 514. The control and management system 514 may include an interface 518 to communicate with the video content storage 508, a processor 516, and memory 520 accessible to the processor 516. The control and management system 514 may also include one or more modules 522-526 to implement functions of the control and management system 514. In an illustrative embodiment, the modules 522-526 can include logic, hardware, computer instructions executable by the processor 516, or any combination thereof. Additionally, the modules 522-526 may be discrete functional elements, such as logic blocks, or may be combined functional elements, such as one or more software instructions set executable by the logic to perform the functions described herein.

In a particular embodiment, the control and management system 514 may be adapted to scan the video content storage 508 to determine whether any of the video content 512 includes target video content. For example, the target video content may include prohibited video content identified at a signature storage 528.

In a particular embodiment, the control and management system 514 may include a signature module 522. The signature module 522 may be adapted to generate a content signature associated with a video content item stored at the video content storage 508. For example, the signature module 522 may access the video content 512 and may determine a series of coefficients associated with a wavelet transform of each video content item. In an illustrative embodiment, a content signature can be generated by applying a wavelet transform to a plurality of subsections of the video content item. For example, the video content item can include Moving Picture Experts Group (MPEG) content having a plurality of frames. The signature module 522 can determine a plurality of subsections of the MPEG video content based at least partially on a sequence of Intra-coded frames (I-frames), Predictive-coded frames (P-frames), or any combination thereof, within the MPEG video content. For instance, each subsection can be identified by a sequence number of an I-frame that is designated as the beginning or end of the subsection. By applying a wavelet transform, such as a Haar wavelet transform, to each of the subsections, a sequence of coefficients can be generated. Illustrative embodiments of content signatures are depicted in FIG. 8.

The system 500 may also include a target content module 523. The target content module 523 may be adapted to compare the content signature to target content signature data based at least partially on content metadata 510 of the video content. For example, content signature associated with a particular video content item may be dependent upon a resolution value of the video content item. The signature storage 528 may include a plurality of target content signatures associated with each target content item. Each of the plurality of target content signatures associated with a particular target content item may be related to a different resolution value. To illustrate, a particular target content item may be associated with a first target content signature determined at a first resolution level. The particular target content item may also be associated with a second target content signature determined at a second resolution level. The signature module 522 may generate a content signature associated with a particular video content item and provide the content signature to the target content module 523. The target content module 523 may determine, based on metadata associated with the particular video content item, a resolution value associated with the video content item. The target content module 523 may access the signature storage 528 and identify target content signature data associated with a similar resolution value. The target content module 523 may compare the target content signature data to the content signature provided by the signature module 522 to determine whether the particular video content item is a target content item.

The system 500 may also include an access module 524. The access module 524 may be adapted to modify access settings of the video content storage 508 when target content is identified. For example, the access module 524 may determine a user associated with uploading the target content to the video content storage 508. The access module 524 may modify the user's rights to access the video content storage 508 based on the user uploading the target video content. To illustrate, the target video content may include prohibited video content, and the user associated with uploading the prohibited video content may be added to a blacklist to be prohibited from uploading video content in the future. In another example, the access module 524 may restrict access to the target video content by all users or a set of users. To illustrate, the target video content may be designated as inappropriate for certain users, such as minors, and the access module 524 may modify access settings associated with the target video content to prohibit certain users from accessing the target video content based on the designation. In a particular embodiment, the system 500 may also include a scrubbing module 525. The scrubbing module 525 may be adapted to remove a video content item from the video content storage 508 when the video content item is determined to include a target video content item.

The system 500 may also include a detection module 526. The detection module 526 may be adapted to determine whether particular video content item has been modified to avoid detection as target video content. For example, a user may modify the format of a video content item, e.g., change the format from an MPEG file to a Windows Media file, in an attempt to prevent the video content item from being identified as target video content. When the detection module 526 determines that a user has modified a video content item, additional measures may be taken to ensure that other content provided by the user at the video content storage 508 does not include target content items.

Figure 6:
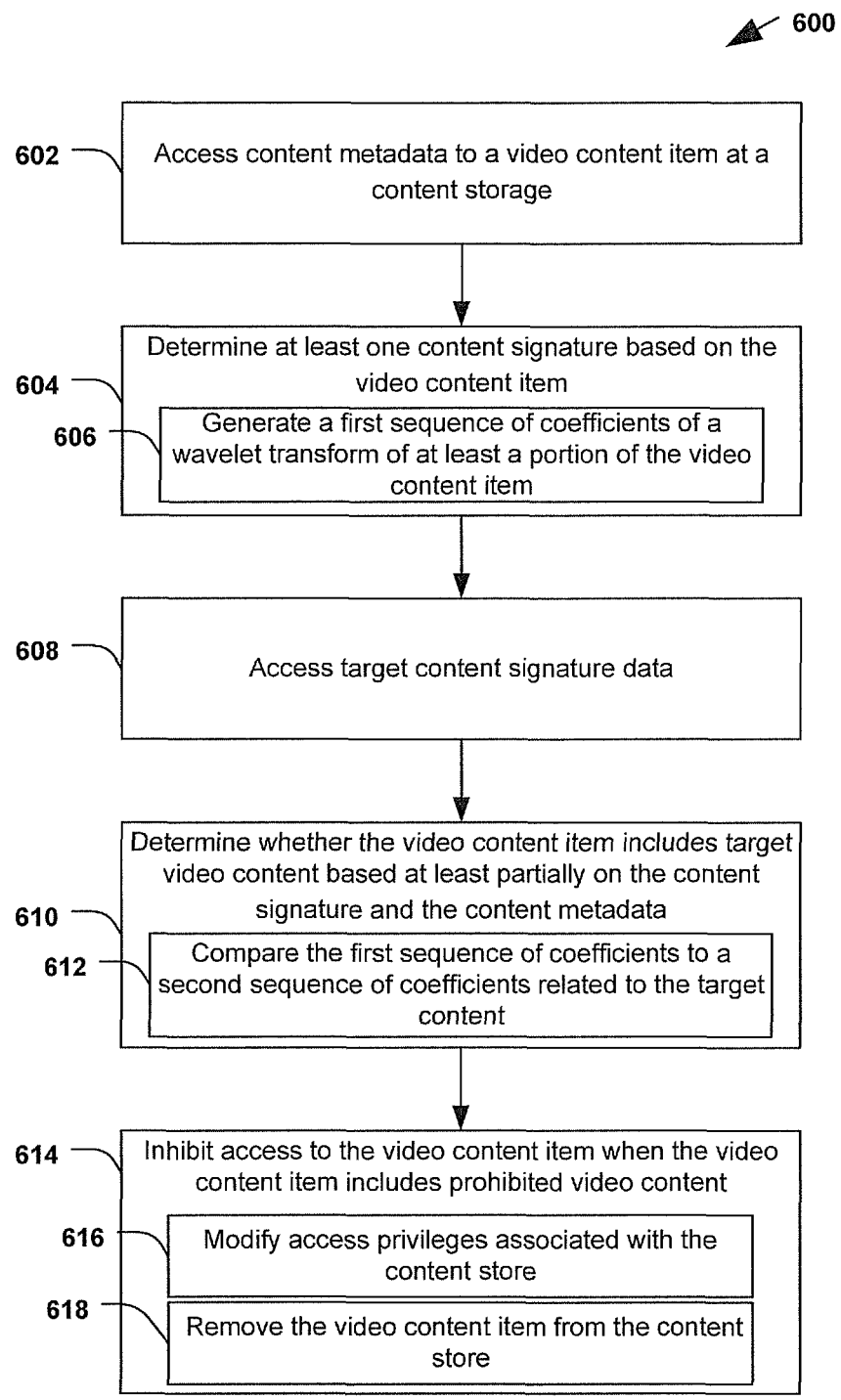
FIG. 6 is a flow diagram of a first particular illustrative embodiment of a method of identifying target video content.

FIG. 6 depicts a flow chart of a first particular embodiment of a method of identifying target video content. The method is generally designated 600. The method 600 includes, at 602, accessing content metadata related to a video content item at a content storage. The method 600 also includes, at 604, determining at least one content signature based on the video content item. For example, determining at least one content signature based on the video content item may include generating a first sequence of coefficients of a wavelet transform of at least a portion of the video content item, at 606.

The method 600 also includes, at 608, accessing target content signature data. The target content signature data may include a plurality of content signatures associated with target content. The target content signature data may also include, metadata associated with the target content.

Figure 9:
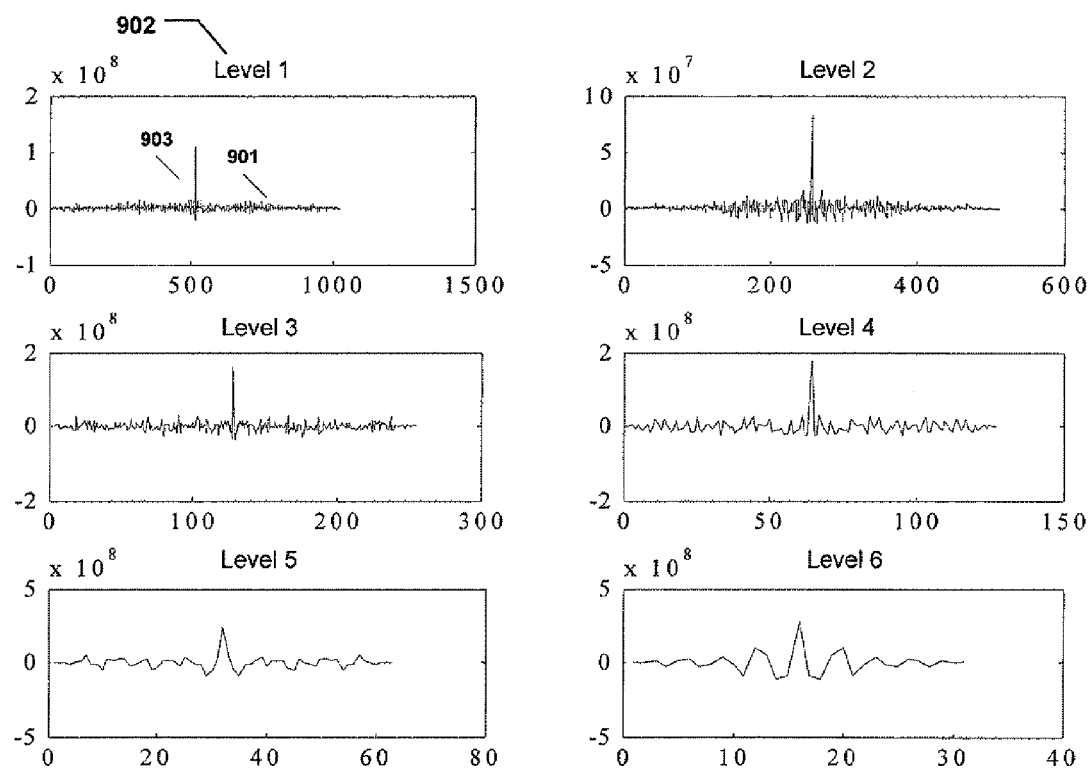
FIG. 9 is a diagram of a particular illustrative embodiment of cross-correlation vectors related to video content.

The method 600 also includes, at 610, determining whether the video content item includes target content based at least partially on the content signature and the content metadata. For example, determining whether the video content item includes target content may include comparing the first sequence of coefficients to a second sequence of coefficients related to the target content. To illustrate, one or more cross-correlation vectors may be evaluated. The cross-correlation vectors may compare a sequence of coefficients of the content signature with a sequence of coefficients of the target content signature data. Similarities between the cross-correlation vectors, such as substantially matching peaks, may indicate that the video content item includes the target content with an acceptable degree of confidence. Examples of cross-correlation vectors are illustrated in FIG. 9. In a particular embodiment, noise corresponding to high-frequency portions of a signal carrying video content may be filtered out before the target content signature data and content signature are compared.

In a particular embodiment, the method 600 may also include, at 614, inhibiting access to the video content item when the video content item includes target video content. In a particular illustrative embodiment inhibiting access to the video content item may include, at 616, modifying access privileges associated with the video content item. For example, the access privileges may be modified such that certain users may not access or view the video content item. In another particular illustrative embodiment, inhibiting access to the video content item may include, at 618, removing the video content item from a video content storage.

Figure 7:
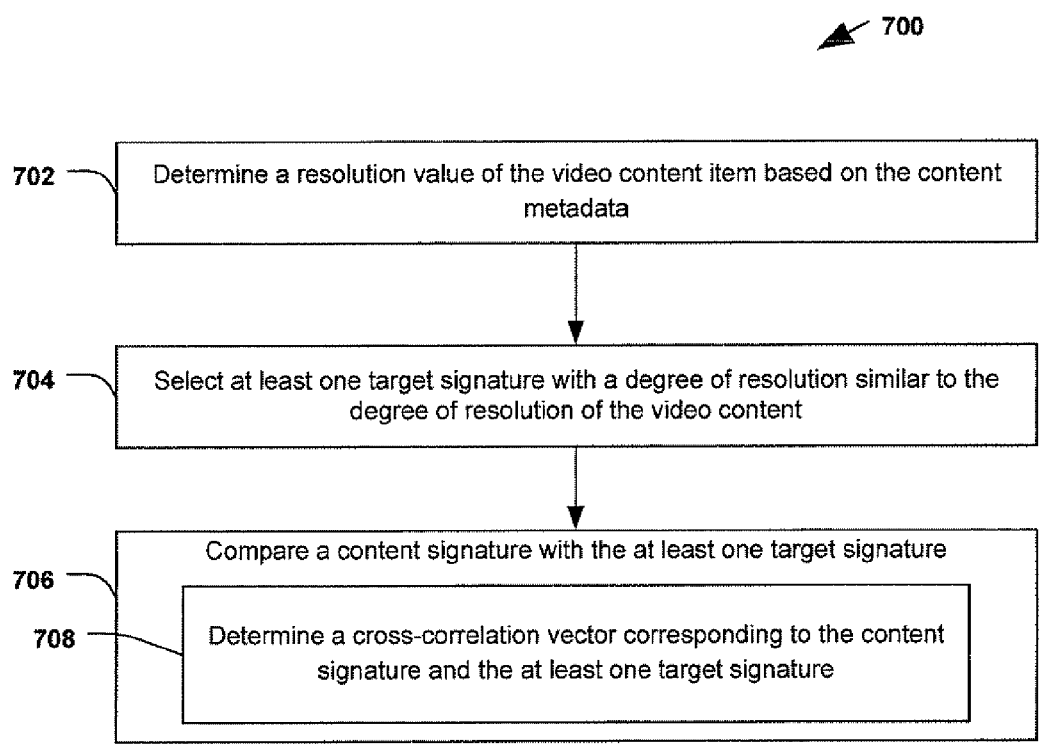
FIG. 7 is a flow diagram of a second particular illustrative embodiment of a method of identifying target video content.

FIG. 7 depicts a flow chart of a second particular embodiment of a method of identifying target video content, generally designated 700. The method 700 includes, at 702, determining a degree of resolution, such as a resolution value, of a video content item based on content metadata associated with the video content item. For example, each video content item in a data store may include data descriptive of the video content item. The data descriptive of the video content item may include a resolution value. The resolution value may be used for example by a video content viewer application in connection with accessing and viewing the video content item.

The method 700 may also include, at 704, selecting at least one target signature with a degree of resolution similar to the degree of resolution of the video content. The method 700 may also include, at 706, comparing a content signature with the at least one target content signature. For example, comparing the content signature with the at least one content signature may include, at 708, determining a cross-correlation vector corresponding to the content signature and to the at least one target content signature.

Referring to FIG. 8, a particular illustrative embodiment of a plurality of signatures corresponding to video content is illustrated. In the embodiment shown, a video content stream 801 includes a plurality of I-frames associated with various sequence numbers 802. In an illustrative embodiment, the video content stream 801 can be represented by a graph showing I-frame bit size 803 for each sequence number 802. A Haar wavelet transform or other wavelet transform can be applied to subsections of the video content delineated by the I-frames to generate a plurality of signatures corresponding to the video content, such as the signatures d1-d11. Each signature includes a plurality of coefficients associated with the same range of sequence numbers as the plurality of I-frames. In a particular embodiment, the plurality of signatures can include a lowest-resolution signature d11 804 having a fewest number of coefficients and a highest-resolution signature d1 805 having a greatest number of coefficients.

Referring to FIG. 9, a particular illustrative embodiment of a plurality of cross-correlation vectors to compare signatures corresponding to video content is illustrated. In the embodiment shown, a plurality of cross-correlation vectors, such as the cross-correlation vector 901, are illustrated. Each cross-correlation vector corresponds to a different level of resolution, such as Level 1 902 and other levels. In a particular embodiment, a cross-correlation peak 903 within each cross-correlation vector can indicate a match between two signatures having the same degree of resolution.

In conjunction with the configuration of structure described herein, the systems and methods disclosed provide identification of target video content and monitoring transmission of video content. In a particular illustrative embodiment, a data stream carrying video content can be sent from a user device to a video content storage via a wide area network. A content control and management system may monitor the transmission and determine if the transmission includes data related to video content. When the transmission includes data related to video content the content control and management system may determine a content signature related to the video content. The content control and management system may also determine content metadata related to the video content. The content control and management system may determine whether the video content includes prohibited content based on the content signature and the content metadata.

In another particular embodiment, a control and management system may access a video content storage to identify target video content. The control and management system may access content metadata related to a video content item at a content storage, and determine at least one content signature related to the video content item. The control and management system may determine whether the video content item includes target content based at least partially on the content signature and the content metadata.

Figure 10:
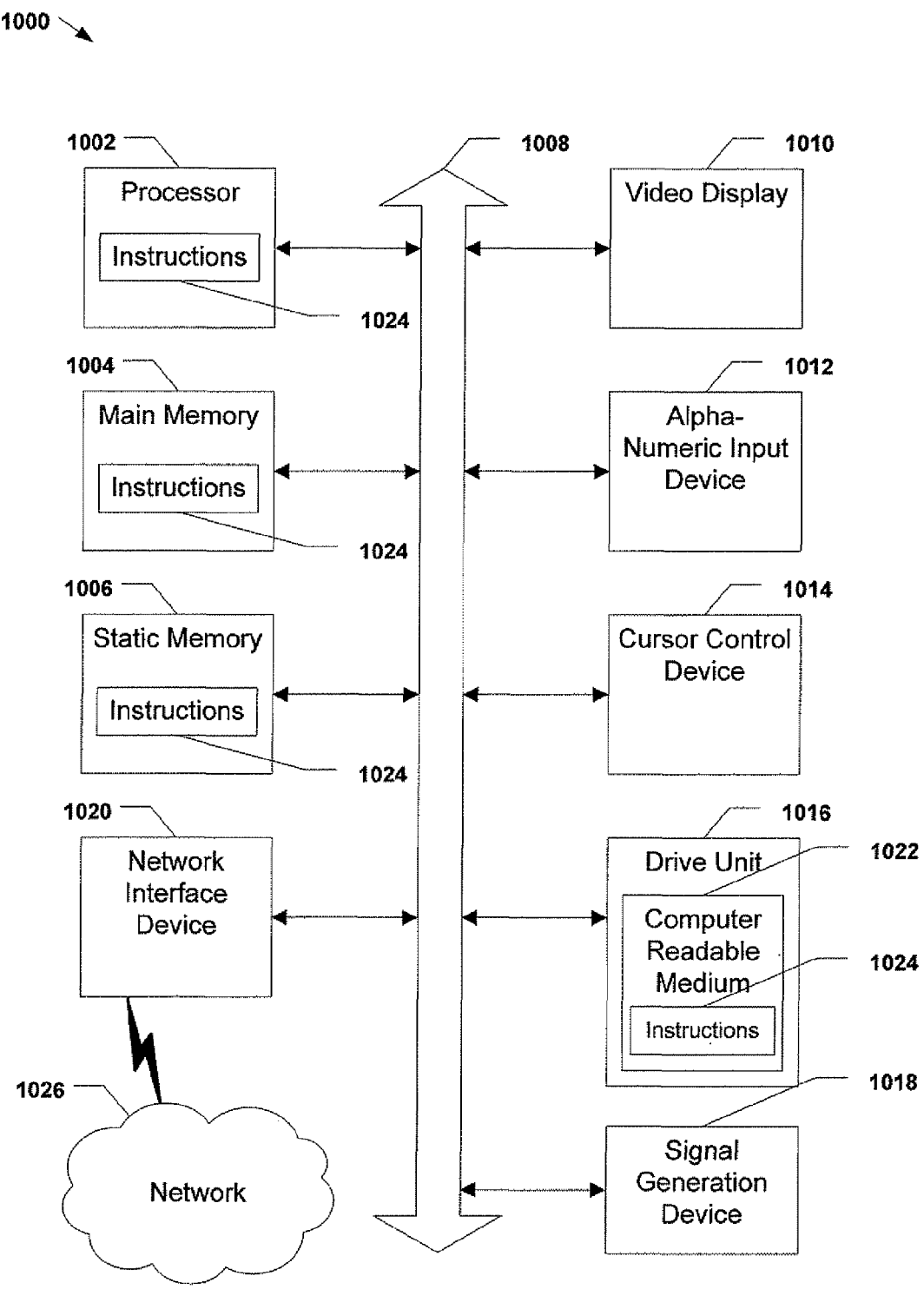
FIG. 10 is a diagram of an illustrative embodiment of a general computer system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. For example, the computer system 1000 may include or be included within any one or more of the user devices, video content storage, content control and management systems, signature storage, or control and management systems illustrated and discussed with respect to FIGS. 1 and 5.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006, that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse or remote control. The computer system 1000 can also include a disk drive unit 1016, a signal generation device 1018, such as a speaker, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
monitoring, by a server, a data transmission of video content;
generating, by the server, a content signature that includes a first sequence of coefficients by application of a wavelet transform to a plurality of frames of a time sequence of frames of the video content;
identifying, by the server, a resolution of the video content based on content metadata associated with the video content;
selecting, by the server based on the resolution of the video content, a set of prohibited content signatures from a plurality of prohibited content signatures, wherein each prohibited content signature of the set of prohibited content signatures has a particular resolution that corresponds to the resolution of the video content and includes a corresponding second sequence of coefficients based on a second wavelet transform applied to particular prohibited content associated with a corresponding prohibited content signature;
performing, by the server, comparisons of the first sequence of coefficients to sequences of coefficients of each respective prohibited content signature of the set of prohibited content signatures;
determining, by the server based on the comparisons, that the first sequence of coefficients matches a sequence of coefficients of a particular prohibited content signature of the set of prohibited content signatures; and
terminating, by the server based, on the determination, the data transmission.

2. The method of claim 1, wherein the content metadata is provided by a transmission of the video content.

3. The method of claim 1, further comprising:
comparing the content metadata to a metadata index to identify a prohibited content item that the video content potentially includes;
accessing the prohibited content signature associated with the prohibited content item, the prohibited content signature that includes a particular second sequence of coefficients;
generating a cross-correlation vector based on the first sequence of coefficients and the particular second sequence of coefficients; and
determining that the video content includes the prohibited content item when the cross-correlation vector includes a cross-correlation peak.

4. The method of claim 1, further comprising, in response to determining that the video content includes prohibited content, generating a record of the data transmission, the record including identity information descriptive of a user device transmitting the video content and content information descriptive of the video content.

5. The method of claim 1, further comprising:
accessing a user profile history, wherein the user profile history includes profile information related to a user associated with the data transmission; and
determining whether the user previously transmitted prohibited video content based on the user profile history, wherein determining whether the video content includes prohibited content occurs in response to a determination that the user associated with the data transmission previously transmitted the prohibited video content.

6. A system comprising:
a network interface to monitor video content included in a data transmission;
a processor coupled to the network interface;
a memory coupled to the processor, the memory storing executable instructions that, when executed by the processor, cause the processor to perform operations including:
generating a content signature comprising a first sequence of coefficients by application of a wavelet transform to a plurality of frames of a time sequence of frames of the video content;
identifying a resolution of the video content based on content metadata associated with the video content;
selecting based on the resolution of the video content, a set of prohibited content signatures from a plurality of prohibited content signatures, wherein each prohibited content signature of the set of prohibited content signatures has a particular resolution that corresponds to the resolution of the video content and includes a corresponding second sequence of coefficients based on a second wavelet transform applied to a particular prohibited content associated with a corresponding prohibited content signature;
performing comparisons of the first sequence of coefficients to sequences of coefficients of each respective prohibited content signature of the set of prohibited content signatures;
determining, based on the comparisons, that the first sequence of coefficients matches a sequence of coefficients of a particular prohibited content signature of the set of prohibited content signatures; and
terminating based on the determination the data transmission.

7. The system of claim 6, wherein the content metadata is provided by a transmission of the video content.

8. The system of claim 6, wherein the operations further include determining whether the video content was modified based on the content metadata.

9. A method comprising:
retrieving, by a server from a content storage device, a video content item and content metadata of the video content item;
generating, by the server, a content signature that includes a first sequence of coefficients by application of a wavelet transform to a plurality of frames of a time sequence of frames of the video content item;
identifying, by the server, a resolution of the video content item based on content metadata associated with the video content item;
selecting, by the server based on the resolution of the video content item, a target signature, wherein a first resolution associated with the target signature corresponds to a resolution of the video content item, and wherein the target signature comprises a second sequence of coefficients based on a second wavelet transform applied to target video content associated with the target signature;
performing, by the server, comparisons of the first sequence of coefficients to the second sequence of coefficients;
determining, by the server based on the comparisons, that the first sequence of coefficients matches the second sequence of coefficients; and
removing, by the server based on the determination, the video content item from the content storage device.

10. The method of claim 9, wherein the target video content comprises prohibited video content.

11. The method of claim 9, wherein the target video content comprises age inappropriate content.

12. The method of claim 9, wherein the content metadata is provided by a transmission of the video content item.

13. The method of claim 9, wherein the server is associated with an Internet service provider.

14. The method of claim 9, wherein the content storage device is operated by a first entity and the server is operated by a second entity.

15. The method of claim 9, wherein inhibiting access to the video content item includes modifying an access setting associated with the video content item to prohibit a user, based on an age of the user, from accessing the video content item.

16. A system comprising:
a processor couple to a communication interface;
a memory couple to the processor, the memory storing executable instructions that, when executed by the processor, cause the processor to perform operations including:
retrieving, from a content storage device, a video content item and content metadata of the video content item;
generating a content signature that includes a first sequence of coefficients by application of a wavelet transform to a plurality of frames of a time sequence of frames of the video content item;
identifying a resolution of the video content item based on content metadata associated with the video content item;
selecting, based on the resolution of the video content item, a target content signature, wherein a first resolution associated with the target content signature data corresponds to a resolution of the video content item, and wherein the target content signature data comprises a second sequence of coefficients associated with a second wavelet transform applied to target video content item;
performing comparisons of the first sequence of coefficients to the second sequence of coefficients;
determining, based on the comparisons, that the first sequence of coefficients matches the second sequence of coefficients; and
removing, based on the determination, the video content item from the content storage device.

17. The system of claim 16, wherein the target content signature corresponds to target content that comprises prohibited video content.

18. The system of claim 17, wherein the operations further include removing the video content item from the content storage device when the video content item includes the prohibited video content.

19. The system of claim 17, wherein the operations further include modifying access privileges associated with the content storage device when the video content item includes the prohibited video content.

20. A computer-readable hardware storage device storing processor executable instructions that, when executed by a processor, cause the processor to perform operations including:

retrieving, from a content storage device, a video content item and content metadata of the video content item;

generating a content signature that includes a first sequence of coefficients by application of a wavelet transform to a plurality of frames of a time sequence of frames of the video content item;

identifying a resolution of the video content item based on content metadata associated with the video content item;

selecting, based on the resolution of the video content item, a target video content signature for a target video content item corresponding to the video content item, wherein a first resolution associated with the target video content signature corresponds to a resolution of the video content item, and wherein the target video content signature comprises a second sequence of coefficients based on a second wavelet transform applied to the target video content item;

performing comparisons of the first sequence of coefficients to the second sequence of coefficients;

determining, based on the comparisons, that the first sequence of coefficients matches the second sequence of coefficients; and modifying an access setting associated with the video content item based on the determination.

21. The computer-readable hardware storage device of claim 20, wherein the operations further include accessing target content signature data, wherein the target content signature data includes a plurality of target video content signatures, and wherein each target video content signature of the plurality of target video content signatures is associated with a different degree of resolution of the target video content item.

22. The computer-readable hardware storage device of claim 20, wherein determining whether the video content item includes the target video content item comprises:

determining a cross-correlation vector corresponding to the content signature and to the target video content signature; and identifying a match between the content signature and the target video content signature based on the cross-correlation vector.

23. The computer-readable hardware storage device of claim 22, wherein the match is indicated by a peak in the cross-correlation vector.

24. The computer-readable hardware storage device of claim 20, wherein the target video content item comprises age inappropriate content.

25. The computer-readable hardware storage device of claim 24, wherein modifying the access setting prevents minors from accessing the video content item.

* * * * *